March 17, 1964     D. G. PITTWOOD     3,124,976
AUTOMATIC TOOL SETTING SYSTEM
Filed May 29, 1961     5 Sheets-Sheet 1

INVENTOR
DONALD G. PITTWOOD
BY
ATTORNEY

March 17, 1964
D. G. PITTWOOD
3,124,976
AUTOMATIC TOOL SETTING SYSTEM
Filed May 29, 1961
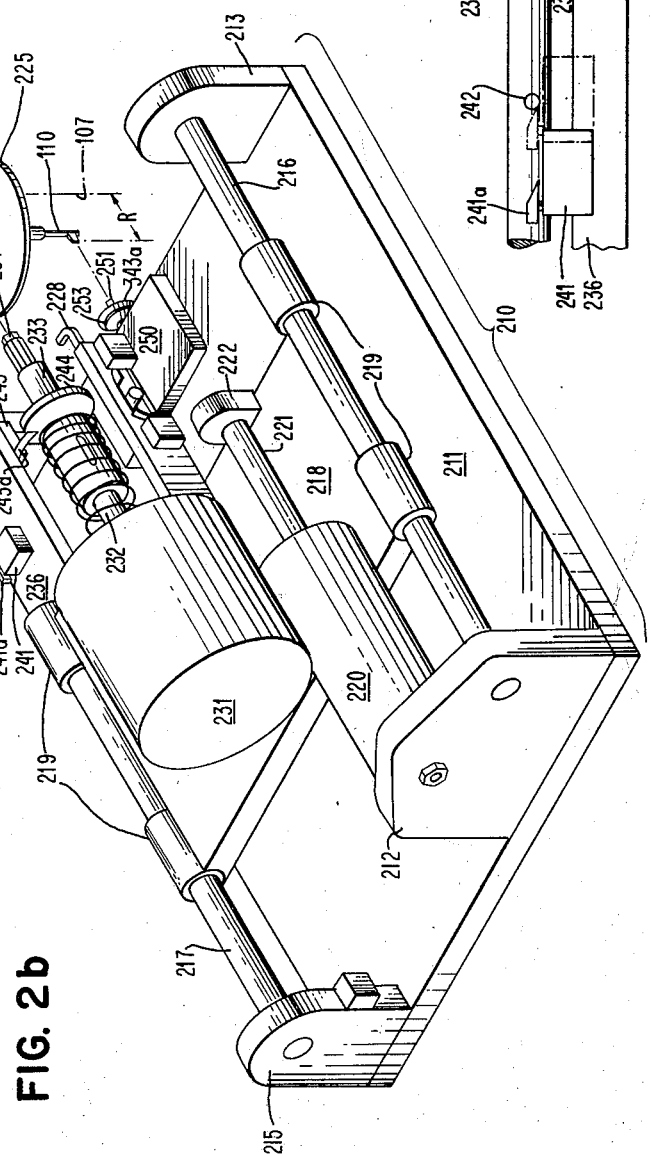
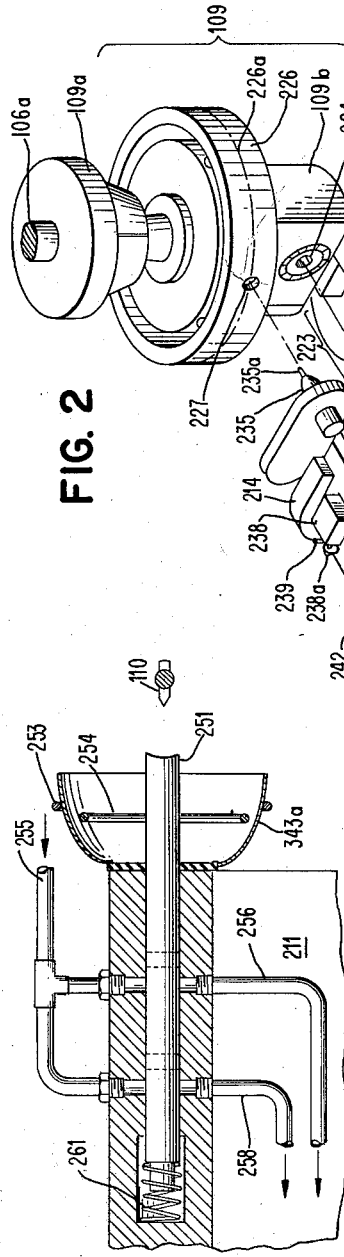

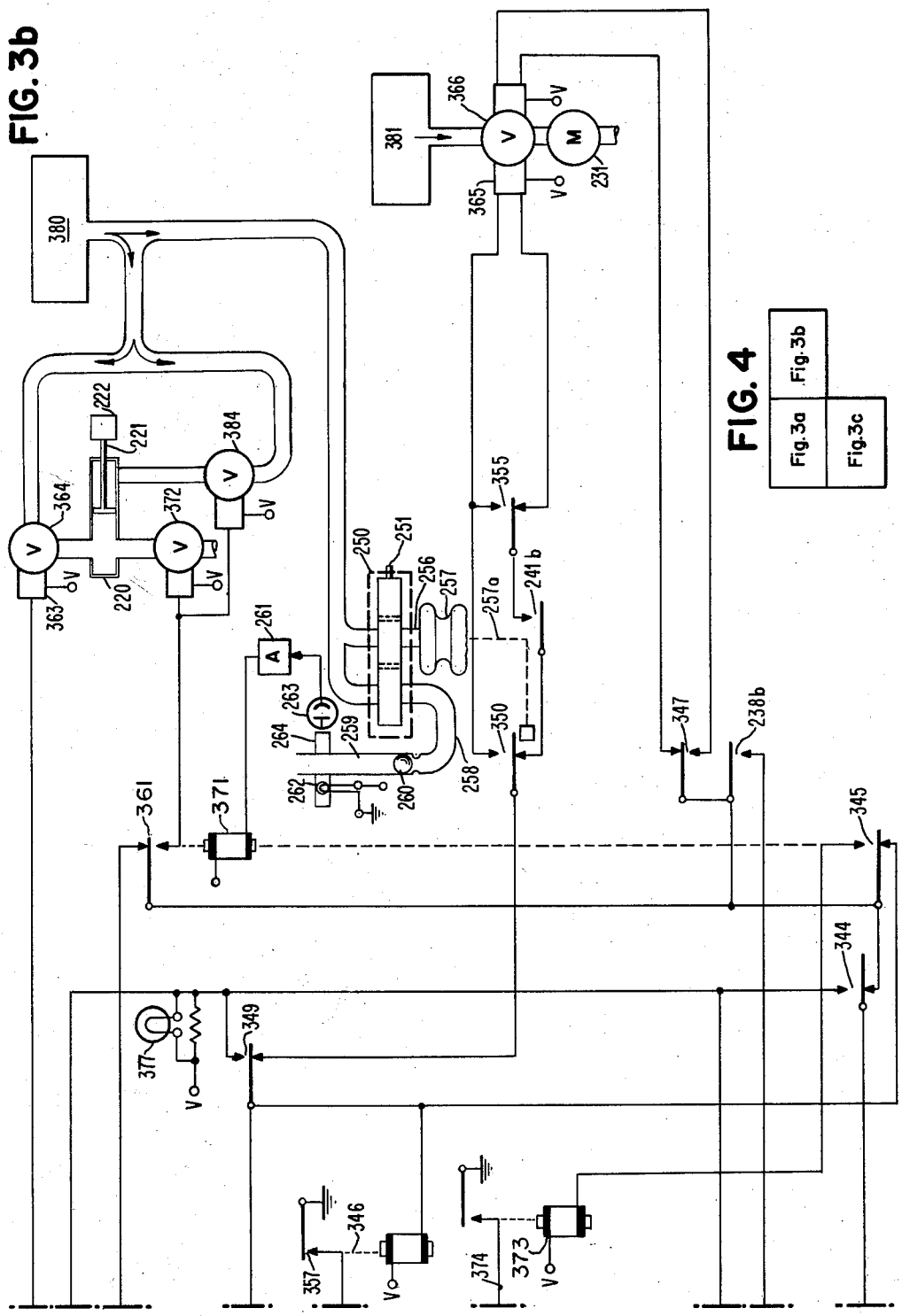
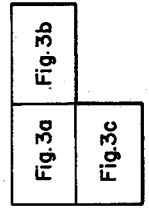

United States Patent Office 3,124,976
Patented Mar. 17, 1964

3,124,976
AUTOMATIC TOOL SETTING SYSTEM
Donald G. Pittwood, Salt Point, N.Y., assignor to International Business Machines Corporation, New York, N.Y., a corporation of New York
Filed May 29, 1961, Ser. No. 113,342
10 Claims. (Cl. 77—4)

The present invention is directed to a system for automatically controlling the setting of a tool in a machine, and is particularly suited for use in a program-controlled machine where it is desirable to adjust tool setting without removing the tool and/or its holder from the machine during the setting operation.

In the past, it has been the practice to provide a machine, such as boring mills, adapted to perform at various, selected points on each of a number of work pieces sequences of operations under the directive control of an external program device or control element. A description of such a machine is to be found in U.S. Patent 2,901,927—Morgan, issued September 1, 1959, and assigned to the same assignee as the present invention. It is pointed out that such machines, including the one shown and described in Morgan cited above, may provide for the exchange of tool-bearing heads under the control of the program element during the execution of the program stored therein. As a result, a variety of operations can be performed on each of a number of work pieces successively placed in the machine, wherein certain characteristics of any single operation are dictated by the choice of head and the tool borne thereby.

While a machine of this type and the system of which it forms a part allow the person preparing the program for storage in the program element to direct at least as many operations as there are heads, and allows complete flexibility of choice of work piece points at which any operation is performed, the frequent exchange of work heads may prove troublesome from the point of view of the programmer. Accordingly, provision may be made in such systems, particularly those used in operations requiring a high degree of accuracy, for permitting a human operator to interrupt operations controlled by the stored program element. Such interruptions may be made for purposes such as checking or resetting tool position relative to the axis or axes of tool movement. While such interruption capability is beneficial because it lends still greater flexibility to the operations which can be carried out by the machine system, it also has drawbacks, for instance, because the efficiency with respect to time of operations performed during manual interruption may be lower than the time efficiency of the programmed machine operations, and because human error may be introduced during periods of interruption.

Accordingly, it is an object of the present invention to provide a new and improved system for controlling tool positioning apparatus in a machine.

Another object of the invention is to provide a system of the above-recited type wherein the machine is particularly adapted to be automatically controlled by a stored program element.

Another object of the invention is to provide an improved apparatus for use in a system comprising a machine under the control of an external program element to change tool adjustment without the necessity for human intervention in the operational programming of the machine.

Another object of the invention is to provide in a system of the type called out in the paragraph next above in which the change of tool adjustment is directed by the stored program element.

Another object of the present invention is to provide new and improved apparatus responsive to sequential control signals for changing the position of a tool borne by a movable element of a machine.

The present invention is to be practiced in a machine which includes a member or head bearing a tool. The machine also includes means for moving the head and tool relative to an axis fixed in space and a table movable relative to the movement axis of the head in a manner which allows the tool to be brought into engagement with and to perform operations on a work piece fixed to the table subsequent to the movement of the table and, if necessary, upon the advance of the tool head in its axis of movement. In this contemplated machine, the head is provided with means for adjusting the effective position of the tool (for instance, the cutting edge) relative to the axis of movement of the head.

According to the invention, there is provided wrench means effective for engaging and operating the above-mentioned tool position adjusting means. In order to control the operation of the wrench means, there also is provided an element having a working surface fixed in spaced relationship with respect to a particular point on the table. Sensing means including this element is operative in response to the engagement of its surface by the tool within the above-recited head for controlling the operation of the wrench means. There is further provided positioning means operative for directively moving the above-recited table to position the reference point relative to the recited element surface at a predetermined distance of the movement axis from the tool bearing head. In order to control the over-all operation of the above-stated apparatus, there is provided still other means for making the positioning means and sensing means operative. With this configuration, the working surface of the element is positioned relative to the movement axis of the head and tool borne thereby, and the wrench means is placed under directive control of the sensing means including the sensing element in order to effect the desired adjustment of the tool position relative to the movement axis of the head and its tool as defined by the physical spacing of the sensing element working surface from the tool movement axis.

The foregoing and other objects, features, and advantages of the invention will be apparent from the following more particular description of a preferred embodiment of the invention, as illustrated in the accompanying drawings.

FIG. 2 shows a detail of the machine table, as well as the wrench and sensing carriage secured thereto;

FIG. 2a shows details of a part of the apparatus included in the carriage shown in FIG. 2;

FIG. 2b shows a sectional view of a part of the apparatus included in the tool setting unit shown in FIG. 2;

Figure 1:
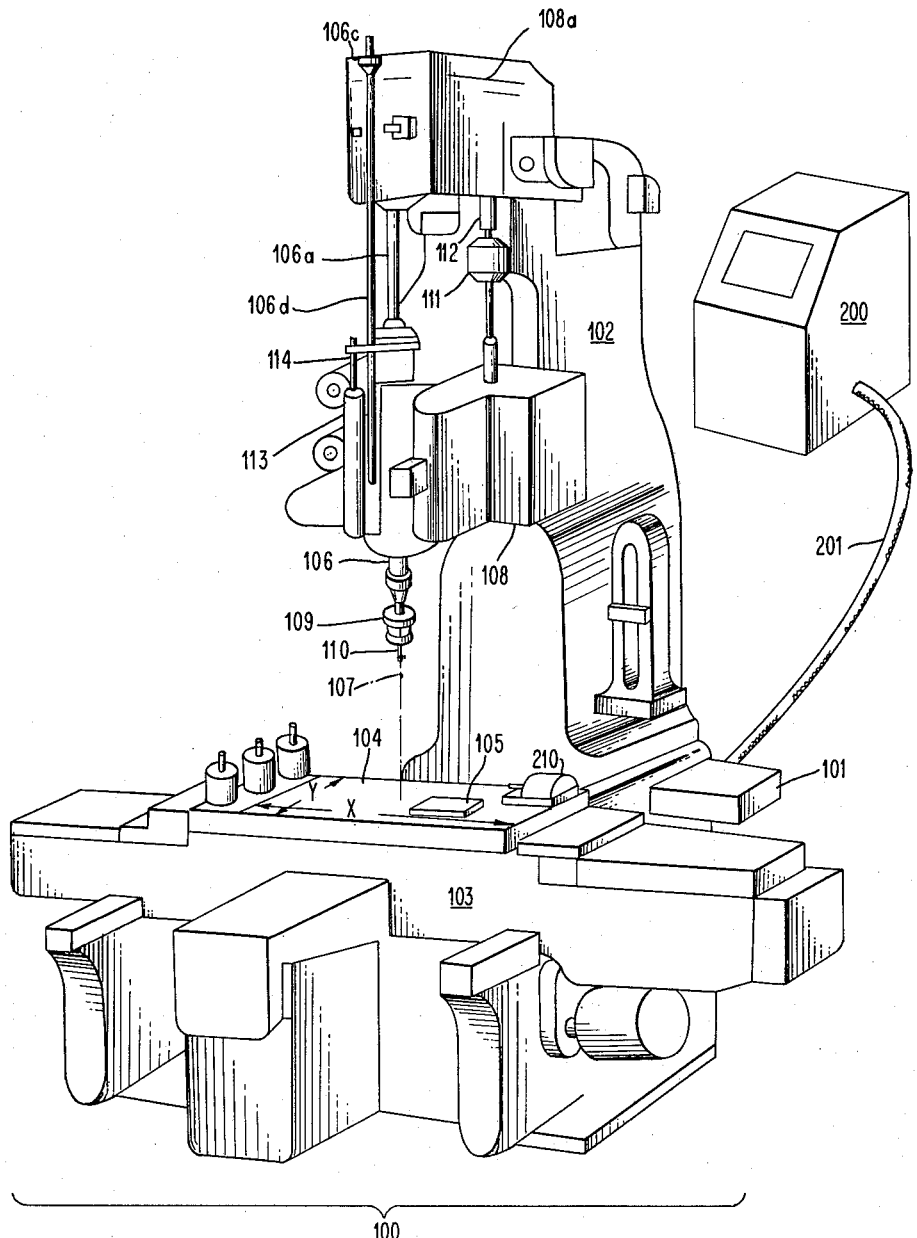
FIG. 1 shows the over-all configuration of a boring mill and its program storage element.
Figure 3A:
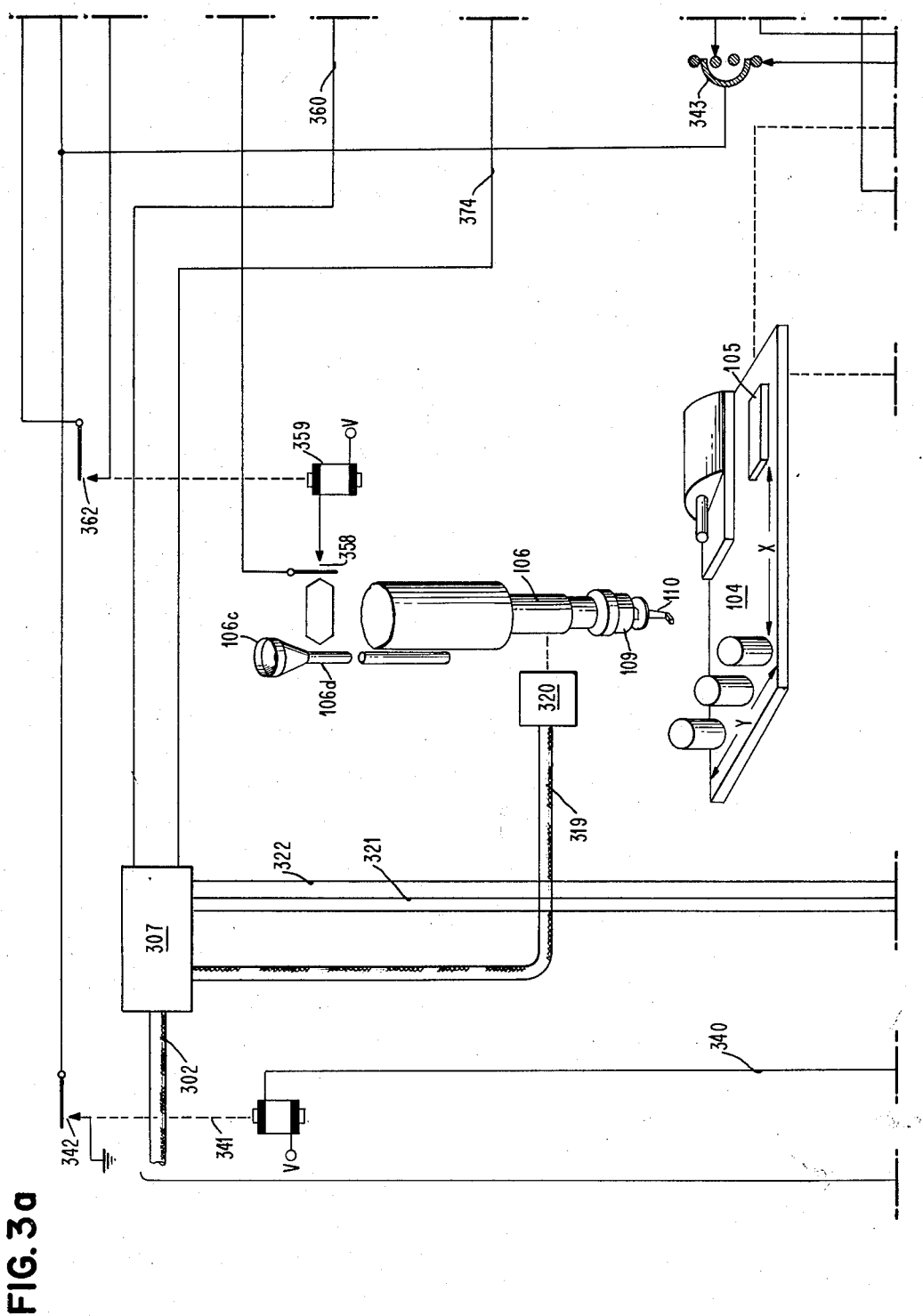
Figure 3C:
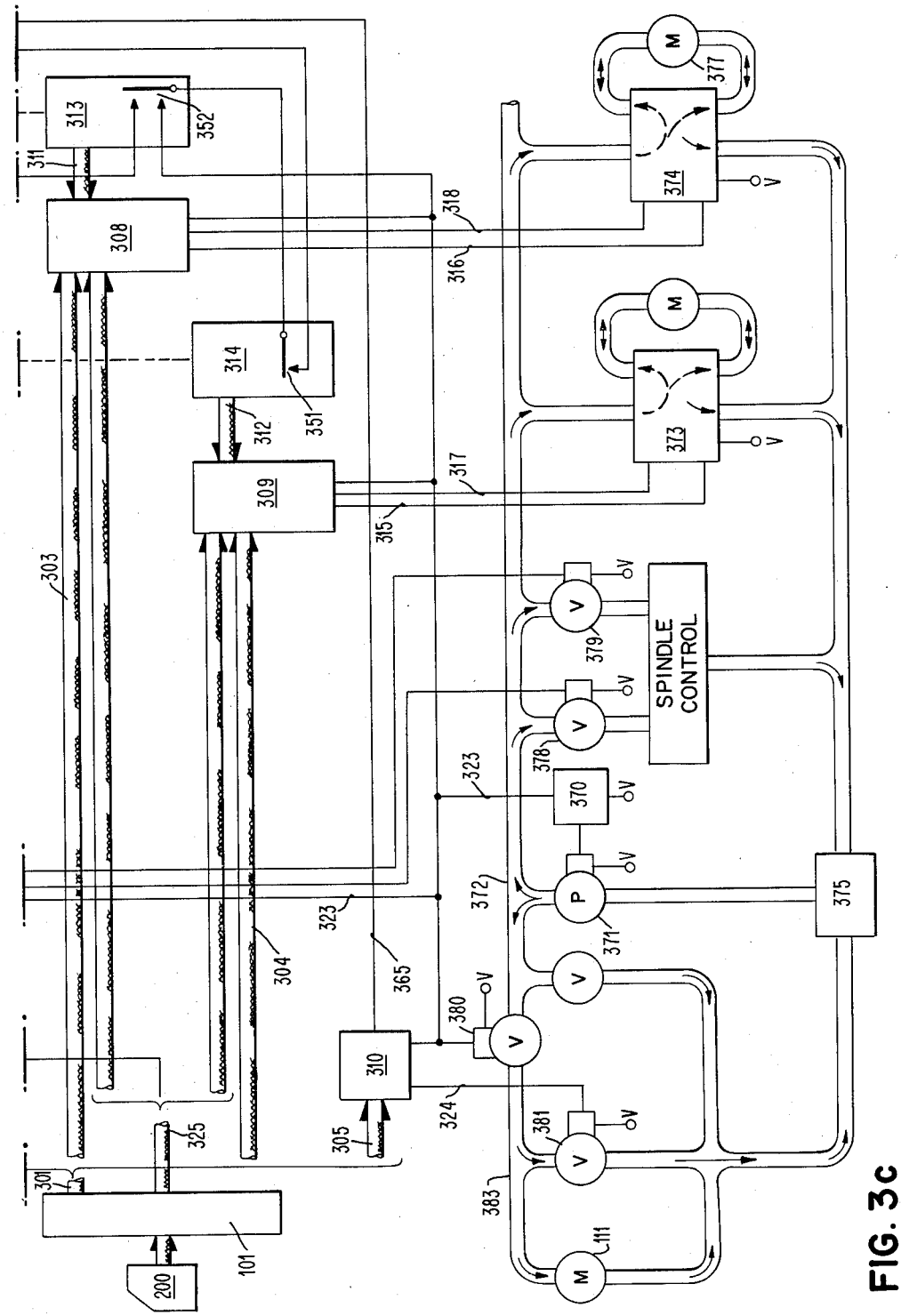

FIGS. 3a, 3b, and 3c disposed in the manner shown in FIG. 4 show a schematic diagram of the electrical and hydraulic control systems used in the mill shown in FIG. 1; and, FIG. 4 shows the order in which FIGS. 3a, 3b, and 3c are to be arrayed.

General Description of Machine and Controls

Turning first to the consideration of the mill itself, it is pointed out that the present invention may be practiced in conjunction with a mill of the general type described in the above-cited Morgan patent. Since the mill, per se, forms only an element of the present invention, a detailed description is available elsewhere, and such a description is unnecessary to those skilled in the art to gain an understanding of the present invention, the present description of operation of the mill is confined to generalities.

Referring to FIG. 1, there is shown boring mill 100 which is adapted to be controlled from program element or console 200. Console 200 may be located remote from mill 100 and electrically interconnected thereto in a suitable manner by wires contained within cable 201 which extends between console 200 and terminal box 101 mounted on main frame 102 of mill 100. Mill 100 also has mounted on frame 102 a table 103 which includes tie-down plate 104. Work pieces, such as 105, may be fixed in any suitable manner to the upper surface of plate 104.

In order to perform machining operations on work piece 105, there is provided spindle 106a to which is joined a cylindrical quill assembly 106. Quill assembly 106 is carried by bearing portion 108 of frame 102 and is constrained to move transversely along the axis indicated as dotted line 107 in the figure. Bearing portion 108 as well as quill assembly 106 also are suitable to allow spindle 106a to revolve about axis 107, so that head 109 fixed in any suitable manner to the lower extremity of spindle 106a and tool 110, which in turn is fixed to head 109, can be revolved about and advanced downwardly along axis 107 to engage work piece 105 after the latter has been suitably positioned by the movement of table 103.

In order to revolve spindle 106a, there is provided hydraulic motor 111 suitably mounted on main frame 102 and having output shaft 112 mechanically coupled to a transmission housed within portion 108a of frame 102. The transmission is of any of a number of acceptable types and has an output coupled in any suitable manner to spindle 106a. In order to advance quill assembly 106 along axis 107, there is provided feed cylinder 113 which is carried on housing portion 108. Cylinder 113 includes piston 114, the upper end of which is mechanically coupled to the upper end of quill assembly 106. Piston 114 is extensible along a line substantially parallel to axis 107, with the result that the application of pressure to ports (not shown in FIG. 1) of cylinder 113 results in the directive raising or lowering of quill 106 with respect to table 103 and hence with respect to work piece 105 or other apparatus secured to tie-down plate 104.

At this point, it is stated that none of the hydraulic and pneumatic lines used to convey fluids under pressure to various elements of mill 100 is shown in FIGS. 1 and 2. This is done in order to simplify the showing of the mechanical relationships of the apparatus shown in those figures and because it is believed that an understanding of the interconnections obtained by use of those lines is adequately shown in a schematic manner in FIGS. 3a, 3b, and 3c.

In order to position work piece 105 with respect to axis 107 (i.e., the axis of rotation of tool 110) suitable hydraulic motors (not shown in FIG. 1) are provided for shifting table 103 with respect to frame 102 in directions indicated in FIG. 1 as "X" and "Y." These X and Y directions are substantially perpendicular to each other and define a plane of motion for any point on the upper surface of 104 or on work piece 105 which is substantially normal to axis 107 along which quill assembly 106 is advanceable in the above-described manner.

Having described the movements through which the major parts of mill 100 may be driven, attention next is directed to the control system used in conjunction with mill 100. In the next following paragraphs, specific reference is made to FIGS. 3a, 3b, and 3c. In these drawings, electrical power is assumed to come from a source which has a first terminal connected to a common ground (indicated in the drawings by a conventional ground symbol) and a second, ungrounded terminal (indicated in the drawings as "V"). The term "signal" used in the succeeding paragraphs refers to electrical current flow in a conductor from the above-described source as the result of the operation of other apparatus. It is to be understood that all devices driven by current from this electrical source are of types commercially available, and that for this reason, such devices are not described in detail. Other symbolic representations of elements and element controls set forth in FIGS. 3a, 3b and 3c are explained as required in the succeeding paragraphs.

It is next assumed that a tool head is in place in quill assembly 106, and that directive control signals originating in console 200 which are included in the instruction to be executed currently by mill 100 are passed over conductors within cable 201. It is assumed that conductors bearing control signals used to direct mill 100 in an operational part of its program are grouped together and emerge from terminal box 101 as a group of conductors indicated as cable 301, and further that sub-groups of cable 301, such as cables 302, 303, 304, and 305 include conductors which extend and are connected to the inputs of spindle control servo element 307, Y servo-control element 308, X servo-control element 309, and spindle rotational control element 310, respectively.

In the course of carrying out an operational program with the tool currently in the mill, there are first received over conductors in cables 303 and 304 position defining signals. These signals are compared in Y and X servo-control elements 308 and 309 to feed-back signals conveyed thereto over a link indicated as cables 311 and 312, respectively. The latter signals are generated by Y and X table position-sensing mechanisms 313 and 314, which have mechanical linkage inputs indicated by dotted lines in FIGS. 3a and 3c extending between tie-down plate 104 and mechanisms 313 and 314, mechanisms 313 and 314 being effective for generating signals on conductors 311 and 312 in accordance with the current position of table 103 and tie-down plate 104.

Note that while the table position-sensing apparatus mentioned above and in paragraphs to follow is primarily electro-mechanical in nature, those skilled in the art will realize that this is done for the purpose of simplifying the present description, and that such apparatus for controlling the X and Y servos as well as the servos themselves might well be of purely mechanical or other nature. Each of elements 308 and 309 is effective so long as the signals on its two sets of input conductors are unlike for: (a) supplying a signal on conductor 323 which is effective to operate motor controller 370 and therewith start main hydraulic pump motor 371, so that pump 371 supplies hydraulic fluid from sump 375 under pressure to main hydraulic distribution line 372; (b) supplying start signals to control valves 373 and 374 over conductors 315 and 316, respectively; and, (c) supplying travel-direction indicating signals over conductors 317 and 318 to valves 373 and 374, respectively.

A start signal supplied to either of valves 373 and 374 is effective for making that valve operative, and together with the above-described directing-indicating signals supplied to the valve is effective for controlling the flow direction of hydraulic fluid from main line 372 via the appropriate valve through hydraulic table positioning motor 376 or 377. By virtue of the operation of the above-described apparatus, any point on table 301, and consequently any desired point on work piece 105 can be shifted into coincidence with the above-described axis 107 of quill 106, with the result that the subsequent lowering of quill 106 into one of its working positions is effective to cause tool 110 to perform an operation centered on a desired point of work piece 105.

Turning next to the vertical position control of quill 106, quill position directing signals are received on conductors of cable 302 subsequent to the receipt of the above-described table positioning signals. As in the case of the table positioning signals, signals received over the conductors of cable 302 are compared in servo-control element 307 to quill position-indicating signals conveyed to that element over conductors in cable 319, the signals on the conductors in that cable being derived from quill position sensing mechanism 320, sensing mechanism 320 having a mechanical input coupled to quill 106 by apparatus indicated by a dotted line in FIG. 3a. So long as element 307 detects a difference between the position to which the quill is directed and the position currently occupied by the quill, servo 307 is effective for producing on one or the other of its output conductors 321 and 322 a signal which is effective for actuating one of control valves 378 and 379, respectively. Valves 378 and 379 are effective for admitting hydraulic fluid from line 372 to the intakes of spindle position control cylinder 113, with the result that quill 106 may be raised or lowered to the point indicated by the signals incoming from control console 200 over the conductor in cable 302.

Near the conclusion of the above-identified vertical positioning operations of quill 106, a set of spindle rotation start signal is received from console 200 over the conductors of cable 305. Such signals are delivered from the conductors to the input of decoder 310 which responds to such signals by producing on its outputs (a) a signal applied to conductor 323 which is effective in the above-described manner to main hydraulic pump 371 in operation, and to operate valve 380; (b) a signal on output conductor 324 which is applied to the electrical input of by-pass valve 381. Valve 380 is effective in response to the receipt of the above-described signal to admit hydraulic fluid from main line 372 to supply line 383 for spindle motor 111. In its normal state, the above-mentioned valve 381 is open and therefore effective to provide a by-pass for hydraulic fluid delivered to line 382 around motor 111, and is effective in response to the above-described signal from conductor 324 to close and therewith block that path, so that motor 111 revolves and in turn revolves spindle 106a and tool holding member 109.

At the conclusion of the operation currently being performed on work piece 105, the apparatus in console 200 is effective for generating another set of commands including a set of spindle retract signals transmitted over the conductors included in cable 302. Accordingly, element 307 is effective for generating on conductor 322 a signal and for removing the above-described signal on conductor 321. The signal on conductor 322 is effective to cause valve 379 to admit hydraulic fluid from main line 372 to the appropriate part of spindle control cylinder 113 and therewith causes the cylinder to raise quill 106 to a retracted position with respect to work piece 105. Subsequent to the retraction of quill 106, the above-described signal contributed by element 307 is removed from conductor 323 as the result of the continuing operation of apparatus in console 200. Subsequent to the receipt of the above-described retract signals, the console 200 apparatus also is effective to remove the previously described spindle rotate signals conveyed over conductors of cable 305, with the result that all previously-described signals are removed from the electrical input of valve 381 and conductor 323. Consequently, the pump 371 stops and the rotation of motor 111 is stopped, so that quill 106 comes to a halt in its retracted position in anticipation of the receipt of the next set of command signals from console 200.

Tool Positioning Control Apparatus

Having described how mill 100 is operate in the course of executing its regular, operational program for performing successive work steps on pieces, such as 105, attention is next turned to the tool adjustment apparatus with which the present invention is concerned. Tool control operations are a part of the program stored in apparatus within console 200, so that commands directing sequences of operations to be carried out in the course of the tool adjustment cycle are transmitted at appropriate times over the conductors in cable 201. For simplicity of description, it is assumed that all conductors used to carry command signals of the type used in the execution of tool setting commands and presently being considered are grouped together and emerge from box 101 in conductors grouped together in cable 325. It is to be understood, however, that conductors in cable 325 may be identical to or connected in parallel with certain conductors within the above-described cable 301.

Before taking up a detailed consideration of the operation of control equipment shown in FIGS. 3a, 3b, and 3c, attention is redirected to FIGS. 1 and 2 in order to describe certain aspects of the mechanical configuration of the wrench and sensing control mechanisms which are a part of apparatus used to practice the present invention.

As previously mentioned, head 109 is fixed by any suitable apparatus, such as chuck 109a, which is suitably fixed to the lower extremity of spindle 106a. Head 109 is in actuality an assembly which includes slide apparatus 223 adapted to be moved within limits toward and away from axis 107 of quill 106 in a direction normal to axis 107. Slide apparatus 223 is guided in such movement by ways (not shown) machined into a lower surface of head member 109b. It is to slide apparatus 223 that the previously mentioned tool 110 is fixed. The position of apparatus 223 relative to axis 107 defines the effective working radius (indicated in FIG. 2 as "R") of tool 110. The minimum radius R to which tool 110 is adjustable is defined as the "0" position. In order to modify the position of tool 110 with respect to radius 107, apparatus provided within head member 109b is operative in response to the rotation of socket assembly 224, the direction of movement of tool 110 being in accordance with the direction of rotation of socket 224. The direction of travel of assembly 223 is substantially parallel with the axis of the opening of socket 224 for reasons that are to be made apparent below. In addition to the above-described apparatus, slide apparatus 223 includes overtravel disc 225 disposed above and movable with tool 110, as well as locating ring 226 which is fixed to and positioned on head member 109b to be concentric with the axis 107 of the head and quill 106. In its outwardly facing surface, ring 226 is provided with the position indicating opening 227 which is space-oriented with respect to socket 224 in a manner to be described presently. The uses and control of the above-mentioned parts of head assembly 109 are brought out in the paragraphs which next follow.

In order to control and test the position of tool 110, there is provided test set unit 210 secured in any suitable manner to tie-down plate 104 on a particular zone or region of table 103 (the upper, right-hand corner of the table as shown in FIG. 1 in the preferred embodiment of the invention). Such a region is reserved for the exclusive use of test set unit 210, and it is planned that an instruction received at mill 100 from console 200 which moves table 103 to the point where this region and unit 210 are brought into working relationship with respect to head 109 is a part of a series of tool positioning control instructions.

In FIG. 2, unit 210 is shown to include base 211 to the opposite ends of which vertical members 212–215, inclusive are fixed. Extending between the upper ends of member pairs 212—213 and 214—215 are rails 216 and 217, respectively, which are oriented in space substantially parallel to each other. Base 211 is oriented with respect to plate 104 in such a manner that rails 216 and 217 also extend in a direction parallel to the previously described X direction of table 103 travel.

A carriage assembly, including plate 218 is disposed between rails 216 and 217, and includes bearing portions 219 fixed to each corner of that plate. Each such bearing portion embraces the appropriate one of rails 216 and 217, and in combination with the other bearing portions constrains plate 218 and apparatus mounted thereon to move along a path parallel to the X direction of movement of table 103. Such carriage assembly movement is effected by double acting air cylinder assembly 220, the base of which is fixed to vertical member 212. The end of actuating piston 221 extending away from assembly 220 is fixed to ear 222 thrown-up on plate 218, so that when air is admitted through a port (not shown in FIG. 2), piston 221 thrusts carriage assembly along its described motion path in the direction of quill 106 and head assembly 109. This direction is arbitrarily designated as forward. Air cylinder assembly 220 is double acting and additionally biased by a return spring (not shown in the drawing), so that after pressure has been relieved in the chamber of cylinder assembly 220 used to move piston 221 in its forward direction and re-applied to a different chamber used for urging piston 221 in its backward direction, piston 221 is made effective to draw the carriage assembly including plate 218 in a backward direction to a normal position determined by the normal position of piston 221. The carriage assembly also includes wrench apparatus fixed in any suitable manner to plate 218. This wrench apparatus and tool position controlling means also borne by unit 210 are to be described in detail hereinafter.

Returning to the consideration of the tool setting operation of mill 100, the receipt from console 200 of the first of a set of commands for directing the re-positioning of tool 110 with respect to axis 107 is effective to cause table 103 to be moved in the previously described manner to a position such that the effective axis of test set unit 210 (such axis to be hereinafter defined) coincides with the Y coordinate of the intersection point on plate 104 and quill axis 107. The second of the command sets advances table 103 and test set unit 210 in the X direction toward the above-mentioned intersection point of axis 107 and plate 104. The X direction motion is programmed to move table 103 to a point where the displacement in the X direction of the working (end) surface of sensing member rod 251 (which is carried by test set unit 210 and described in detail hereinafter) is displaced from axis 107 by a distance substantially equal to the effective radius R to which it is desired to set tool 110.

In order to activate circuitry used in a sub-program which includes the controlled operation of the above-mentioned wrench and position sensing means, there is provided means which operates in response to the movement of table 104 and the zone to which unit 210 is fixed into working relationship with head 109. The last named means is mounted on bed 103 and mill 100 and includes independently operable, normally open X and Y zone switches 351 and 352, respectively. The mechanical configuration of the mechanism actuating these switches is such that each switch is operated (i.e., closed) only when table 103 is positioned to bring the aforementioned zone reserved for test set unit 210 into working orientation with head 109.

Assuming that test set unit has been positioned in the above-described manner, and that zone switches 351 and 352 have been operated, the next-received command in the tool positioning program of commands from console 200 is a signal conveyed to the winding of relay 341 over conductor 340 and which continues for the duration of the tool-setting sub-program. Relay 341 thereupon operates and remains in operated state throughout the remainder of the presently considered tool setting operation. Operation of relay 341 closes make contacts 342, which in turn allows means including switches 351 and 352 to supply a signal to render operative means which lowers quill 106 and head 109 into a working relationship with test set unit 210 and sets off other events included in the execution of the tool setting operation. These last named means, events and operations are next described in detail.

Referring to FIGS. 3a, 3b, and 3c, the above-described closing of contacts 342 is effective to complete a circuit for operating spindle down relay 346 over the following path: from ground through make contacts 342, the break portion of program error sensing device 343, now closed make contacts 351 and double-make contacts 352, the break portions of pressure gage switch 344 and photorelay contact set 345 and the winding of relay 346. Relay 346 thereupon operates to complete a circuit at its make contact 357 which is effective for supplying a signal to input 360 of the above-described servo 307. Servo 307 is preprogrammed to respond to the application of a signal to its input 360 to lower quill 106 and its attached head 109 into working relationship with test set unit 210.

Upon the completion of the lowering operation of the spindle, spindle-down stop 106c (attached to quill 106 by rod 106d) engages and operates make contacts 358, thereby completing a circuit for operating spindle-down stop relay 359. The circuit is traced from ground through the above-traced circuit for operating relay 346 and extending further through make contacts 358 and the winding of spindle down stop relay 359. Stop 106c is positioned on rod 106d in such a manner that relay 359 is operated only after head 109 has been lowered into the desired working relationship with unit 210.

As shown in FIG. 2, the previously mentioned wrench means borne by the carriage assembly includes hydraulically operated motor 231 having output shaft 232, which is coupled by suitable spring means to wrench assembly 233. Wrench assembly 233 includes hex wrench 234, the shaft of which extends in a direction along the previously described X axis of table 103 and is to engage the above-described socket 224 on head 109 upon the advance carriage assembly and upon the proper orientation of head 109 with respect to test set unit 210. The advance of the carriage assembly is next described.

The operation of relay 359 is effective for starting the advance of the test set unit 210 carriage assembly in the forward direction in order to advance wrench 234 beyond the confines of unit 210 in the direction of socket 224. To this end, a circuit for energizing wrench extend solenoid 363 is completed from the portion of the above-traced circuit for operating relay 346 which includes contacts 342, 343, 351, 352, and 344, and further including the break portions of photo relay contact set 361, now closed make contacts 362 on relay 359 and the winding of solenoid 363. The solenoid of wrench extended valve 364 is therewith actuated and causes valve 364 to admit air from reservoir 380 to the input of the previously described cylinder 220 and therewith causes the above-described carriage assembly including wrench 234 to be advanced in the direction of head 109.

In order to rotationally position head 109 so that wrench 234 may be advanced into socket 224, spindle rotation control apparatus is included in the present system. As shown in FIG. 2, such apparatus includes locating sensor 235 which is carried on arm 236 which extends forwardly from the above-described carriage assembly plate 218. Arm 236 and sensor 235 are oriented in space with respect to wrench 234 in such a manner that tip of sensor 235 engages the guide ring 226 (along a line indicated as 226a, on which opening 227 is located) prior to the advance of the wrench 235 into socket 224.

As the carriage assembly of test set unit 210 is advanced in the above-described manner and sensor 235 engages the surface of rig 226 at a point other than opening 227, spindle rotate switch 238, which is of any of a number of acceptable types of so-called over-center or snap-action switches, and which is fixed to arm 236, also is advanced until its actuator 238a engages and is moved inwardly by stud 239 which is fixed to and extends upwardly from rail 217. Switch 238 includes a set of make contacts indicated in FIG. 3b as 238b. It is pointed out that the further forward movement of the above-described carriage which takes place at the time the tip of sensor 235 drops into opening 227 as head 109 is rotated allows the carriage to advance forwardly until actuator 238a is carried past stud 239, therewith allowing the actuator to again restore contacts 238b to their normal, open condition and stopping the rotational movement of spindle 106a by opening the above-described circuit for energizing decoder 310. The physical arrangement of the switch actuator is indicated in FIG. 2a, a view of carriage 210 looking downwardly on sections of rail 217 and arm 236. In FIG. 2a the solid lined figures show the normal positions of switch 238 and actuator 238a relative to stud 239 and the dotted line figure shows the position of those elements relative to stud 239 subsequent to the movement of the carriage assembly completed after the tip of sensor drops into opening 227.

Closing of contacts 238b is effective for completing a circuit which energizes decoder 310 via special input 365 over that portion of the circuit used for operating relay 346 which includes contacts 342, 343, 351, 352, and 344, and which further includes contacts 238b and input 365 of decorder 310. Decoder 310 is responsive to signals applied to its input 360 to provide signals in the above-described manner which are effective to actuate motor 111 and therewith revolve spindle 106 and head 109. As indicated above, the rotation of spindle and head 109 continues until contacts 238b are opened in the above-indicated manner. It is pointed out that the orientation of opening 227 with respect to socket opening 224 is such that when the rotation of head 109 is stopped in the above-described manner, the further extension of wrench 234 by the further advance of the carriage assembly on which the wrench is borne is effective to cause wrench 234 to be advanced toward and later within the opening of socket 224. From the time the end of wrench 234 is brought into engagement with the face of socket 244 until it is admitted into socket 224, it is necessary to rotate wrench 234 at a comparatively low rate of speed in order to allow the working surfaces of wrench 234 to engage properly the corresponding working surfaces within the socket 224 opening. Later, with wrench 234 properly engaged, it is possible to rotate the wrench at a higher speed and therewith reduce the time required to set tool 110 to the desired position.

In order to start the rotation of wrench 234, there is provided final position, snap-type switch 241 mounted on arm 236. As shown in FIG. 2a, switch 241 is disposed on arm 236 to allow switch actuator 241a to engage stud 242, which extends upwardly from rail 217, the engagement being effective upon the movement of carriage including plate 218 to the point where the end of wrench 234 engages socket 224 to close contacts indicated as 241b in FIG. 3b. The shape of actuator 241a is such that contacts 241b continue to remain closed after the carriage has been advanced still further by the admission of wrench 234 into the opening of socket 224. The closing of contacts 241b is effective for preparing a circuit for either of the two inputs of solenoid 365 which in turn controls valve 366. Valve 366 controls the admission of fluid from reservoir 381, where pressure is maintained by means not shown, to the inlet of the aforementioned wrench motor 231. Valve 366 has off, on-low speed, and on-high speed settings for making corresponding regulations in the speed of motor 231. Accordingly, valve 366 is operative from its normal, off state to its high and low speed settings in response to the application of signals to the lower and upper inputs, respectively, of solenoid 365. The circuit for delivering such a signal is traced over the part of the above-described circuit for operating relay 346 which includes contacts 342, 351, 352, 344, and 345, and is further traced through the break portions of over-travel switch contacts 349 and transducer pressure switch 350, and now-closed make contacts 241b to the transfer part of speed control switch contacts 355. It is the position of contacts 355 which control the admission of signals from the just-traced circuit to the low speed (upper) input and the high speed (lower) input. The operational control of contact set 355, and hence speed control of motor 231 is next described.

Contact set 355 is included in switch 243, which is mounted on the under-side of arm 236 adjacent to flange 244, the latter being a part of wrench assembly 233. The position of switch actuator 243a and consequently position of switch contacts 355 is controlled by the position of wrench assembly relative to arm 236. It is to be recalled that assembly 233 is spring coupled to motor shaft 232. This spring coupling is effective to urge assembly 233 away from and along the length of shaft 232 and therefore into a particular position relative to actuator 243a. Such position dictates the normal position of control contact set 355 shown in FIG. 3b. Upon the advance of wrench 234 to the position where its end engages member body 109b at a point other than within the opening of socket 234, back pressure exerted by such contact urges wrench assembly 233 and flange 244 backwardly with respect to the carriage including arm 236 and therefore exerts a pressure on actuator 243a sufficient to cause contacts 355 within switch 243 to assume an operated position. Such operation of contacts 355 energizes the upper (low-speed) input of solenoid 365 over an obvious circuit. The resulting actuation of valve 366 and the admission of fluid from reservoir 381 to the inlet of motor 231 causes wrench 234 to be revolved in the absence of further advance of the carriage bearing wrench 234 toward head 107.

When wrench 234 has been revolved to the point where its working surfaces coincide with corresponding working surfaces of socket 224, wrench assembly 233 under the urging of the above-described spring which couples assembly 233 to shaft 232 advances in a forward direction with respect to carry carriage assembly 218, so that wrench 234 is admitted into its working position within the opening of socket 224. This motion of wrench assembly 233 in a forward direction with respect to carriage arm 236 allows contact set 355 to return to its normal state, de-energizing the upper input of solenoid 365 and energizing the lower input of that solenoid. As a result, wrench 234 is revolved at a relatively high speed until the next described sensing apparatus is made operative to slow and thereafter stop motor 231 by other conrol of he above-described circuits for energizing solenoid 365.

In order to determine when the working surface of tool 110 has been advanced from axis 107 to the desired radius as determined by the setting of test set unit 210 with respect to axis 107, there is provided a sensor unit including air valve assembly 250 having transducer rod 251, valve 250 being disposed on plate 211 in a manner to allow rod 251 to extend forwardly from the end of plate 211 and with the end, working surface of rod 201 disposed to engage the working surface of tool 110 as the latter is advanced in the direction of unit 210 under the control of the wrench assembly and its actuating apparatus. Referring to FIG. 2b, a sectional view taken through valve 250, as tool 110 is advanced in the above-described manner and engages the end surface of actuator rod 251, the rod is forced rearwardly with respect to unit 210 against the pressure of biasing spring 261. In the course of this motion, rod 251 reaches a point where an opening passing through the rod is in registry with ports in the valve frame assembly which connect air inlet 255 with outlet 256. As the movement of rod 251 is continued, another opening passing through that rod is brought into registry with a second set of ports which connect inlet 255 to outlet 258. The use to which valve 250 is put in the tool position sensing apparatus and wrench controlling apparatus is next set forth.

Referring to FIG. 3b, and assuming that rod 251 has been engaged and advanced to the point where air inlet 255 is connected to outlet 256 in the above-described manner, air under pressure is admitted from reservoir 380 to the interior of pressure switch assembly 257. Pressure switch 257 may be of any of a number of commercially available types and is operative in response to the build-up to a pre-determined, minimum pressure as the result of air flow to its interior in the above-described manner in order to cause mechanical linkage indicated by dotted line 256a to operate the previously mentioned transducer pressure switch contacts 350 which form a part of pressure switch 257. With switch 257 disposed in the above-described manner, the operation of contacts 350 is effective for indicating the approach of the working surface of tool 110 to its required displacement from axis 107. As tool 110 nears its final position, it is desirable to have the tool moved at a lower rate of speed into its final position and therewith insure a finer control of the position finally assumed by tool 110. Accordingly, the operation of switch contacts 350 opens the above-traced circuit for supplying an actuating signal to the high and low speed inputs of solenoid 365 at the break portions of contact set 350, and is further effective to complete at the make portion of contact set 350 an obvious circuit for energizing the low speed (upper) input of solenoid 365. Such action is effective for causing valves 366 to reduce the flow of fluid to motor 231 and therewith correspondingly reduce the speed of rotation of motor 231. Such speed reduction, of course, directly reduces the speed of wrench 234 and therefore the speed of advance of tool 110 toward its final position.

The advance of tool 110 into its final position is indicated by the above-described advance of rod 254 to the point where inlet 255 of valve 250 is connected to the outlet 258. Upon the occurrence of this event, air from reservoir 380 is admitted to the inlet of air gage assembly 259 which may be of any of a number of commercially available types. As pressure within the vertical, transparent cylinder of the air gage builds up, an opaque ball 260 disposed within and free to rise along the length of the cylinder is raised by such pressure to the point where the ball interrupts a beam of light normally passing from continuously energized lamp 262 via collimator 264 to photo-cell 263. Photo-cell 263 and its companion amplifier circuit 261, both of which may be of any of a number of commercially available types, normally are effective for withholding a signal for operating photo-relay 271 from the winding of that relay. However, in the case where the beam of light is interrupted by the movement of ball 110 into the part of the beam which passes through the cylinder of gage 259, the photo-cell amplifier circuits become effective to provide an operating signal which is applied to the winding of relay 371 over an obvious circuit. The resulting operation of relay 371 is sustained until quill 106 is raised in the course of ending the presently-described tool adjusting sub-program or routine.

The operation of relay 371 is effective: (a) to open at break portion of contacts 361 the circuit for energizing the solenoid of valve 363, so that therewith valve 363 closes and removes pressure from air cylinder 220 and, (b) completing an obvious circuit through the make portion of contacts 361 for energizing the solenoids of valves 372 and 384 in order to cause valve 372 to open and therewith relieve the residual pressure within cylinder 220 and to admit air through valve 384 to the other side of double acting cylinder 220. As a result, the carriage 218 of test set unit 210 including wrench assembly 233 is withdrawn from socket 224 under the urging of air pressure admitted through valve 384 and of the previously-mentioned biasing spring.

The operation of relay 371 is further effective for opening at the break portion of contact set 345 the previously traced circuits for operating relays 346 and 359, as well as the circuits for supplying operating signals to solenoid 365 of motor control valve 366. As a result, valve 366 is returned to its normal closed state and thereupon stops further flow of fluid to motor 231 and consequently stops wrench 234 from being further revolved. The operation of relay 371 is further effective for completing at the make portion of make contacts 345 an obvious circuit for energizing spindle up relay 373. The operation of relay 373 is effective for supplying a signal to input 374 of servo 307. Servo 307 is pre-programmed to respond to a signal over input 374 by furnishing a signal on conductor 322, which in turn opens valve 379 and therewith raises quill 106 in the above-described manner to its normal position. The above-described apparatus now is ready to receive the next command from control console 200 which signals the end of the tool setting operation.

The end of the tool setting operation of mill 100 and the use of test set unit 210 is indicated by the removal of the previously described signal from conductor 340, such removal taking place as the result of the operation of programming equipment within console 200. The removal of the signal from conductor 340 is effective to return relay 341 to its normal condition, therewith removing the operating signal supplied to the various elements of the tool positioning wrench operation, sensing, and wrench control circuits described above by opening supply contacts 342.

In order to safe-guard both tool 110 and apparatus borne within test set unit 210 from damage in the event certain unplanned motions of tool 110 with respect to test set unit 210 occur, several protective and alarm devices are provided. The first of these is the so-called program error detector, which is to be operative in the event tool 110 is brought into the general area of sensor rod 257, but fails to register with the working surface of that rod. As indicated in FIG. 2b, the program error detector includes a cup-shaped, slightly resilient conductive member 343a fixed to and insulated from the housing of valve 250. Member 343a is disposed substantially concentrically with rod 251 and includes a first ring conductor 253 placed about the outside of and normally in electrical contact with the external surface of member 343a in such a manner that a slight pressure exerted on any point on member 343a is sufficient to electrically open the contact between member 343a and ring 253. Member 343a and ring 253 form the break portion of contacts shown in FIG. 3a as contact set 343. With this arrangement, it is obvious from the explanation of the above-described circuitry that such an opening is sufficient to close valve 364 and therewith stop the advance of tool 110 in the direction of test set unit 210. The program error detector further includes an interior conductive ring of the program error detector normally maintained spaced-apart from member 343a and placed in electrical contact with that member only when the member is distorted by the engagement of any portion of the member by tool 110. In FIG. 3a, this inner ring and cup member are represented as the make portion of contacts 343. The establishment of such a connection is effective for completing an obvious circuit for energizing lamp 377 and any other apparatus which may be connected in parallel with that lamp.

Other devices of like nature are provided by energizing lamp 377 upon the occurrence of abnormal conditions in the course of setting the position of tool 110. For instance, over-travel switch contacts 349 are actuated by the advance of slide member 228 beyond the admissible length of travel for that slide and to the point where over-travel disc 225 engages over-travel switch actuating bail 228. Operation of contact set 349 completes a circuit at the make portion of contacts 349 for energizing lamp 377 and at the break portions of those contacts opens the above-described circuit for solenoid 365 and therewith stops the further advance of tool 110.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. In a machine having a member which bears a tool, means for adjusting the position of said tool relative to said member, a table having a surface divided into zones and movable with respect to said tool, means directively operative for moving said table, and means for moving said member and said tool with respect to said table in order to allow performance of operations employing said member and apparatus fixed to the surface of said table in one of said zones, the combination comprising: setting means including a unit fixed to a particular zone of said table for operating said tool position adjusting means, programming means for directing said table moving means and said unit into working relationship with said member, other means for directing said setting means to perform a routine of sequential operations, and means including an element operative in response to the movement of said table and the zone to which said unit is fixed into working relationship with said member for making said other means operative.

2. In a machine having a member which carries a tool and is movable with respect to an axis fixed in space, a table movable with respect to the axis of movement of said member and said tool, means for directing any point on said table into space relationship with respect to the axis of movement of said member, and wherein said member includes means for positioning said tool in spaced relationship to the axis of movement of said member and said tool, the combination comprising: wrench means effective for operating said tool positioning means, sensing means including an element fixed in spaced relationship to a particular point on said table operative in response to the movement of said tool to a displacement from the axis of movement of said member equal to the displacement between said table reference point and the axis of movement of said member for controlling the operation of said wrench means, and programming means operative for causing said table directing means to move said table and therewith displace said element along a line of movement of said table with respect to said axis by a desired distance and thereafter effective for making said wrench means and said sensing means operative.

3. In a machine having a member carrying a tool, means for moving said member with respect to an axis fixed in space, and a table movable with respect to the axis of movement of said member whereby said tool may perform operations on a piece fixed to said table when said tool is advanced to engagement with said piece, and wherein said member includes means for moving said tool with respect to the axis of movement of said member, the combination comprising: wrench means effective for operating said tool moving means, means including an element fixed to and in spaced relationship to a particular point on said table operative in response to the physical engagement of said element by said tool for stopping the operation of said wrench means, positioning means operative for directively moving said table to position said element a pre-determined distance from the axis of movement from said member, and programming means for rendering operative said positioning means and starting the operation of said wrench means in the order named.

4. In a machine having a member bearing a tool which normally is operative with respect to an axis fixed in space, said member including adjustable means operative for positioning said tool with respect to the axis of movement of said member, and a table movable with respect to the axis of movement of said member, the combination comprising: a unit fixed to a point on said table, said unit including wrench means and sensing means, said wrench means being effective for operating said tool positioning means and said sensing means being engageable by said tool for controlling the operation of said wrench means, means operable for directing the movement of said table and therewith positioning said sensing means to a point displaced from the movement axis of said member by a desired distance, and means operative subsequent to the operation of said table movement directing means for rendering said wrench means and said sensing means operative.

5. In a machine having a member which bears a tool operative and movable with respect to an axis fixed in space, said member including means operative for positioning said tool with respect to the movement axis of said member and said tool, a table movable with respect to the axis of movement of said member, and means for moving said table to position any point on said table to a desired displacement from the axis of movement of said member, the combination comprising: a unit fixed to said table with reference to a particular point on said table, said unit including a wrench operative upon its engagement with said tool positioning means on said member for operating said tool positioning means, said unit also including an element engageable by said tool, means for directively operating said wrench, means including said element for controlling the operation of said wrench and programming means for directively causing said table moving means to move said table and said unit-borne element into a desired spaced relationship with said member and effective for thereafter rendering operative said wrench operating means and said wrench operation controlling means.

6. In a machine having a head which bears a tool, means for revolving said head about a particular axis and a table movable in a plane substantially normal to the axis of movement of said head, said head including means for positioning said tool with respect to the axis of rotation thereof, the combination comprising: a unit fixed to said table, means for moving said table and said unit in working relationship with respect to said head, said unit including a carriage which in turn bears a wrench movable in the direction of said head subsequent to the operation of said table moving means for operating said tool positioning means, zone means operative in response to the positioning of said table and said unit in working relationship to said head, and means including said zone means operative subsequent to the operation of said table moving means for causing said carriage and said wrench to be extended into engagement with said tool positioning means.

7. The machine set forth in claim 6 wherein said tool positioning means includes a rotatable socket, said socket being disposed on said head with its working surfaces extending inwardly from an opening and revolvable about an axis of rotation on said head which is substantially normal to the axis of rotation of said head, and wherein said wrench includes a revolvable shaft having its principal axis and working surfaces disposed to lie in the direction of travel of said carriage with respect to said unit and said table, a ring borne by and disposed substantially concentrically with respect to said head, said ring having an opening therein disposed in a fixed relationship with respect to the opening of said socket, and means including a sensor borne by said carriage and effective for engaging the surface of said ring upon the advance of said carriage toward said head for maintaining said wrench spaced apart from said head and effective upon the admission thereof into the opening of said ring for allowing said carriage to advance said wrench into engagement with said socket.

8. The machine set forth in claim 6 and wherein said wrench shaft is included in an assembly movable along the length of said shaft with respect to said carriage and said sensor, spring means normally effective for urging said wrench assembly in the direction of travel of said carriage and toward said head, means including a switch borne by said carriage operative in response to the movement of said wrench assembly relative to saoid carriage for controlling the speed of said motor, said switch being operative in response to the advance of said wrench into engagement with said head for causing said motor to operate in a first particular speed and operative upon the further advance of said carriage toward said head brought about by the registration of said wrench and said socket working surface for rotating said motor at a relatively high speed.

9. The machine set forth in claim 6 wherein there is included spindle control means operative for moving said head in the direction along the axis of rotation of said head, spindle raising means operative for causing said spindle control means to urge said head to a position remote from said table, and spindle lowering means operative for causing said spindle controlling means to urge said head in a position adjacent to said table, said zone means in operated condition also being effective for rendering operative said spindle lowering means.

10. The machine set forth in claim 9 and having in addition means operative in response to the positioning of said head adjacent to said table for operating said carriage advancing means.

References Cited in the file of this patent
UNITED STATES PATENTS

| | | |
|---|---|---|
| 1,012,091 | Markland | Dec. 19, 1911 |
| 2,759,530 | Herr | Aug. 21, 1936 |
| 2,809,539 | Hennessy | Oct. 15, 1957 |
| 2,945,401 | Howey et al. | July 19, 1910 |